United States Patent

Oberkofler et al.

[11] Patent Number: 5,242,593
[45] Date of Patent: Sep. 7, 1993

[54] METHOD FOR REDUCING THE BUILD-UP OF SLIME AND/OR FILM IN WATER CIRCULATION SYSTEMS

[76] Inventors: Jörg Oberkofler, Litzlberg 23A, 4863 Seewalchen, Austria; Ing. Christine, Schillerstrasse 32, 6204 Taunusstein 1, Fed. Rep. of Germany

[21] Appl. No.: 678,862

[22] Filed: Apr. 1, 1991

Related U.S. Application Data

[63] Continuation-in-part of Ser. No. 447,898, Dec. 8, 1989, abandoned.

[30] Foreign Application Priority Data

Dec. 9, 1988 [DE] Fed. Rep. of Germany ....... 3841596

[51] Int. Cl.⁵ .......................... C02F 3/34; C02F 3/02; B08B 3/00; D21F 1/66
[52] U.S. Cl. ................................. 210/606; 210/611; 210/620; 210/631; 210/764; 210/765; 162/161

[58] Field of Search ............... 210/606, 610, 611, 632, 210/764, 765, 766, 620, 631; 162/161

[56] References Cited

U.S. PATENT DOCUMENTS

| | | | |
|---|---|---|---|
| 4,370,199 | 1/1983 | Orndorff | 162/161 |
| 4,532,007 | 7/1985 | Noren | 162/161 |
| 4,684,469 | 8/1987 | Pedersen et al. | 210/632 |
| 4,872,986 | 10/1989 | Stringfellow et al. | 210/611 |
| 4,936,994 | 6/1990 | Wiatr | 210/632 |

Primary Examiner—Thomas Wyse
Attorney, Agent, or Firm—Fay, Sharpe, Beall, Fagan, Minnich & McKee

[57] ABSTRACT

In order to reduce the build-up of slime and/or film in plants which circulates water, non-sessile microorganisms are added in single form to the circulating water, whereby the quantity of microorganisms added is about 1 to $10^{10}$ microorganisms per kg of the total organic carbon (TOC) of the organic substances present in the circulating water.

19 Claims, 9 Drawing Sheets

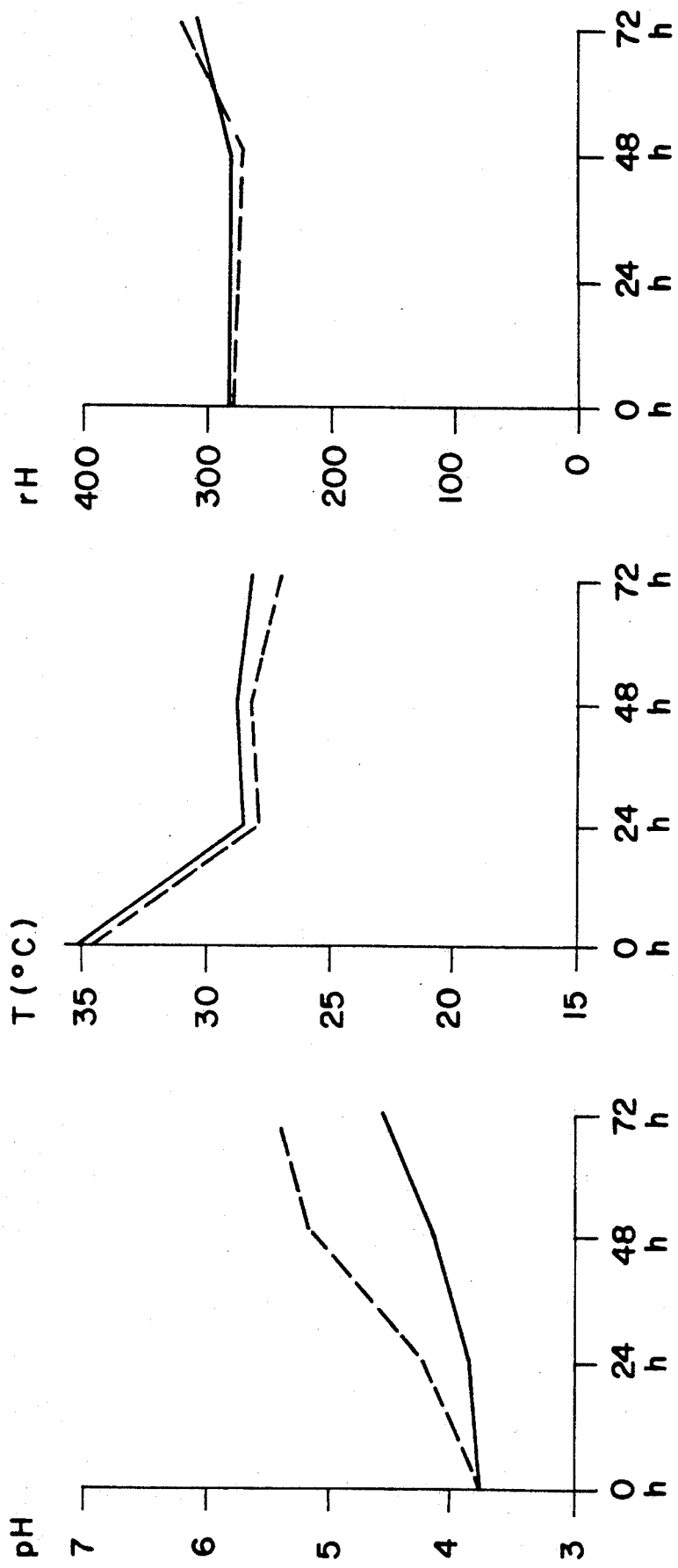

METHOD FOR REDUCING THE BUILD-UP OF SLIME AND/OR FILM IN WATER CIRCULATION SYSTEMS

This application is a Continuation-In-Part of U.S. Ser. No. 07/447,898, filed on Dec. 8, 1989, now abandoned.

BACKGROUND OF THE INVENTION

The present invention relates to a method for reducing the build-up of slime and/or film in a plant that circulates water. The invention is also based on a system for carrying out this method, as well as the various applications of this method for preventing the build-up of slime and/or film in a wide variety of industrial processes utilizing water circulation.

Water circulation, in particular the closed circulation of white water in paper machines, such as a twin-white former paper machine, and/or the circulation of cooling water, involves the problem that slime and/or film forms and builds up on the solid surfaces that are in contact with the liquid phase involved in the circulating process (cf. "Vortrage anlablich des 5. PTS-WAF-Lehrgangs, Fortbildungskurs zur Wasser- und Abwasseranalytik, Kontrolle des Einsatzes von Mikrobioziden in der Papiererzeugung" ("Lectures in the Fifth PTS-WAF Course, Further Education on Water and Waste Water Analysis, Control of the Use of Microbiocides in Paper Production"), organized by the "Papiertechnische Stiftung," Munich, and Hans-Dietrich Held "Kuhlwasser" ("Cooling Water", Vulkan-Verlag Dr. W. Claussen, Essen, 1977, pp. 70–73)).

In the closed circulation of the white water, a process which is increasingly being used for paper machines, microorganisms find good growth conditions due to the high organic and inorganic nutrients present in the white water, as well as the favorable environmental conditions produced in the closed circulation systems, i.e. high temperatures, pH values close to neutral, and ample supplies of oxygen. Since many of the microorganisms are not present in the circulating water as free organisms but settle onto the fibrous, and/or fine materials present in the circulating system, as well as the surfaces of the machine parts, such as pipes, vessels, and pumps, an undesirable build-up of slime and/or film results. When the slime and/or film is detached from these surfaces, it often leads to the formation of lumps in the circulating material which may produce damage to the circulating end product such as the production of holes in the paper web produced by circulating water paper machines. This weakens the paper web, causes it to tear, thereby resulting in machine shutdowns. In order to prevent this build-up of slime and film, it is known to add biocides, lignosulfonates, or enzymes to the white water.

The use of biocides suppresses the growth of the microorganisms in the circulating water, as well as partly damages the organisms structure. However, the use of biocides is increasingly being criticized. When a greater amount of biocides is being used, it results in an increasing amount of damage to the environment to which the white water is released when the circulation process has been completed and the waste water has been emptied. Since the microorganisms tend to become resistant to biocides, it is also necessary to change the biocide substances frequently and/or to increase their amount. This means a increase in pollution or considerable costs, e.g. the necessity of utilizing a clarification plant or a drainage ditch for preventing such pollution damage.

Furthermore, in addition to the use of biocides to combat the build-up of microbial slime and/or film, lignosulfonates are also used as so-called "complexers" which prevent the microorganisms from taking in food under certain conditions. Sometimes a biocide may also be used with the lignosulfonates, but a much smaller amount of the biocide is necessary than if the biocide is used alone (cf. German Patent No. 34 47 686). Thus, even with the use of lignosulfonates the problems of biocides continue to exist but in milder forms.

In addition, enzymes may also be added to the circulation water in order to convert the high molecular polymers, which promote the build-up of slime and film, into low molecular products. This method is environmentally safe but has not proved to be very useful in large scale applications, presumably because it only allows for a brief reduction of viscosity while the hydrolysis or other low molecular products formed by the enzymes may even be the preferred food for the slime forming microorganisms.

Cooling water circulation involves the problem that leaks, or points of contact within the circulating product stream such as the condensation of gases in the cooling circulation which arise during vaporization processes in the circulating product stream, cause organic impurities to frequently pass into the circulating water. This again leads to the growth of microorganisms. Together with the organic and inorganic impurities, these microorganisms form deposits on the surfaces of the heat exchangers, thereby drastically reducing the efficiency of heat transmission. This necessitates the frequent and expensive cleaning of the heat exchangers in order to maintain the heat removal efficiency needed for the particular process. In this case, biocides are also used to reduce the build-up of slime and film on the heat exchanger surface.

The present invention is therefore based on the problem of finding an environmentally safe method of reducing the build-up of slime and film in water circulation systems, thereby reducing the shut-down periods of the processing plant.

This problem is solved by the methods stated below whose characterizing feature is that additional specific non-sessile microorganisms are added in single form to the circulating water. Surprisingly enough, when the inventive method is carried out and the additional microorganisms are selectively added to the circulating water in accordance with its organic load, there is a clear reduction in the build-up of slime and/or film on the solid surfaces and in the liquid phase.

BRIEF DESCRIPTION OF THE DRAWINGS

A more complete appreciation of the invention and many of the attendant advantages thereof will be better understood by reference to the following detailed description when considered in connection with the accompanying drawings, wherein:

FIGS. 4A-4I, are graphs representing the various properties produced through the addition of *Lactobacillus brevis* (B) to paper recycling water over 72 hours. (A) represents a parallel test over the same time period, under the same conditions, the only difference being that this sample was not inoculated with the *Lactobacillus brevis* microorganism.

SUMMARY OF THE INVENTION

Figure 1:
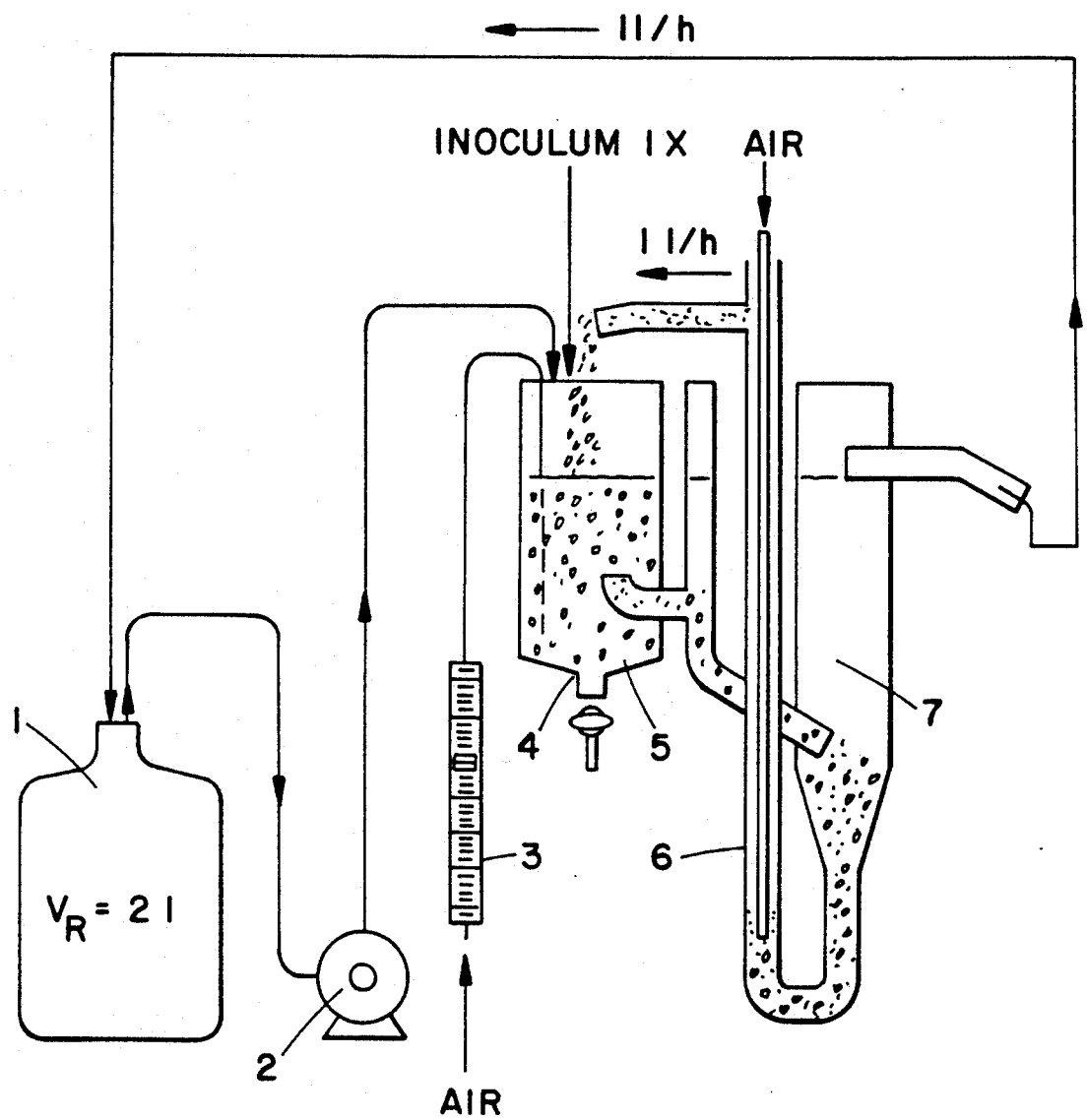
FIG. 1, is a representative diagram of the experimental plant utilized in Example 1 to demonstrate the enhanced properties produced by the present invention.
Figures 2A, 2B, 2C:
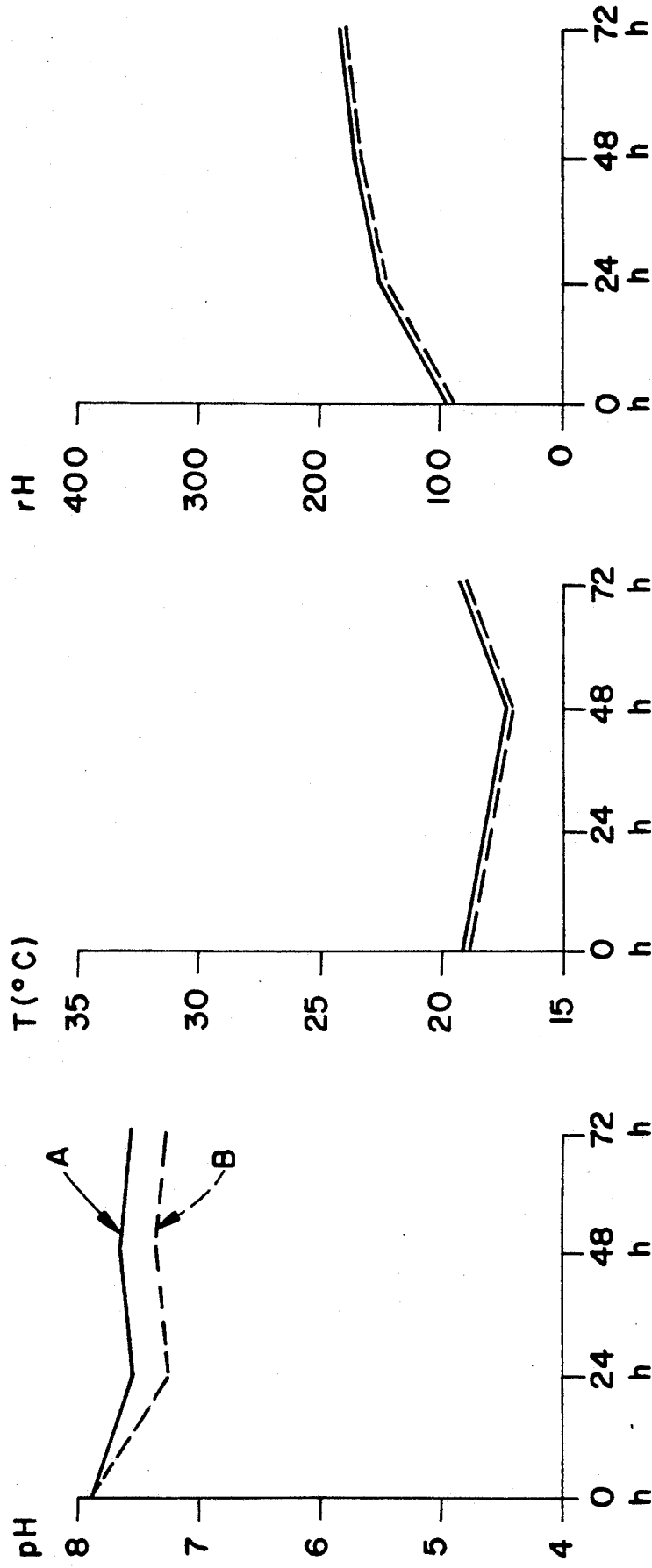
FIGS. 2A–2F, are graphs representing the various properties produced through the addition of *Bacillus subtilis* (B) to paper recycling water over 72 hours. (A) represents a parallel test over the same time period, under the same conditions, the only difference being that this sample was not inoculated with the *Bacillus subtilis* microorganism.
Figure 2F:
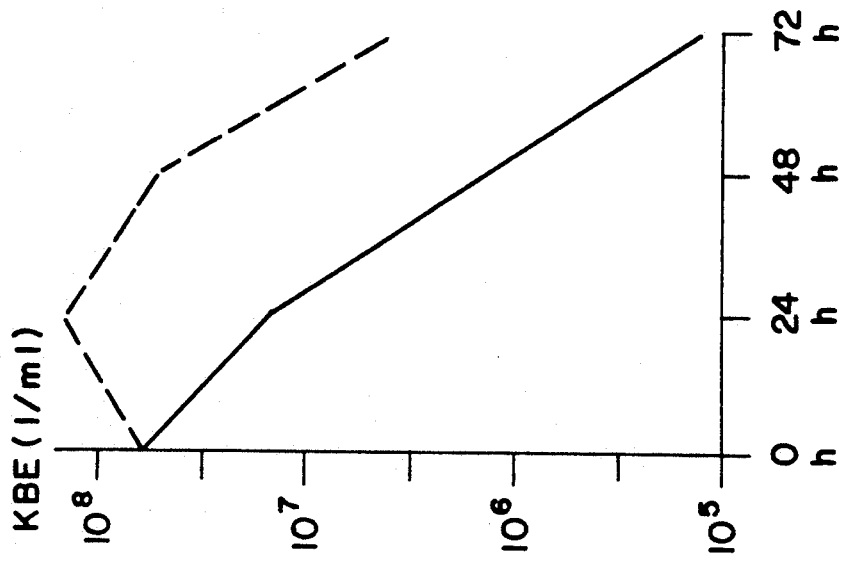
Figure 2E:
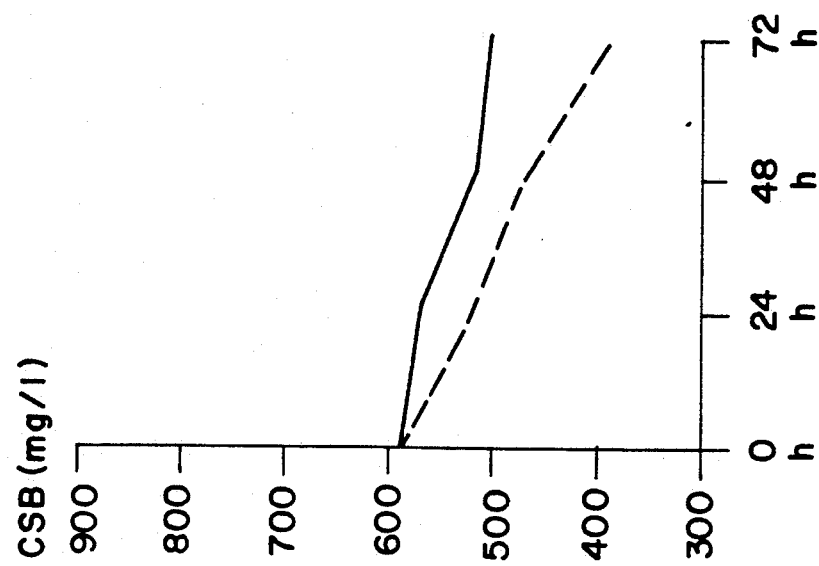
Figure 2D:
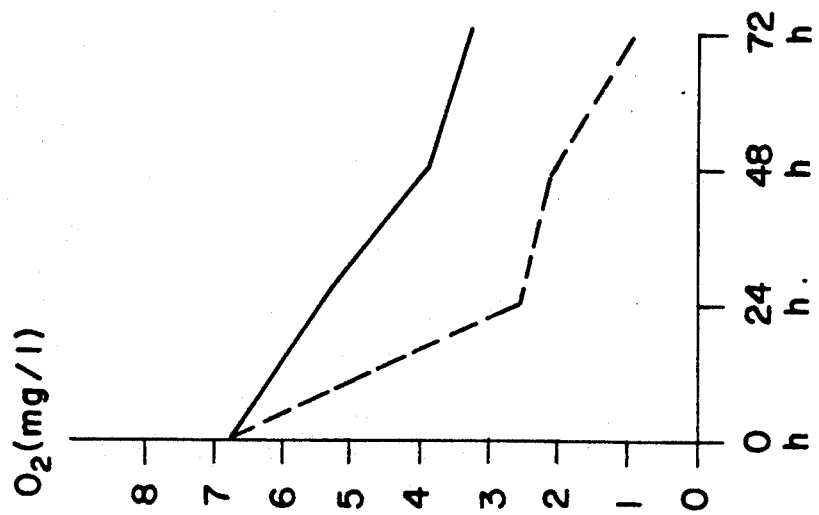
Figures 3A, 3B, 3C:
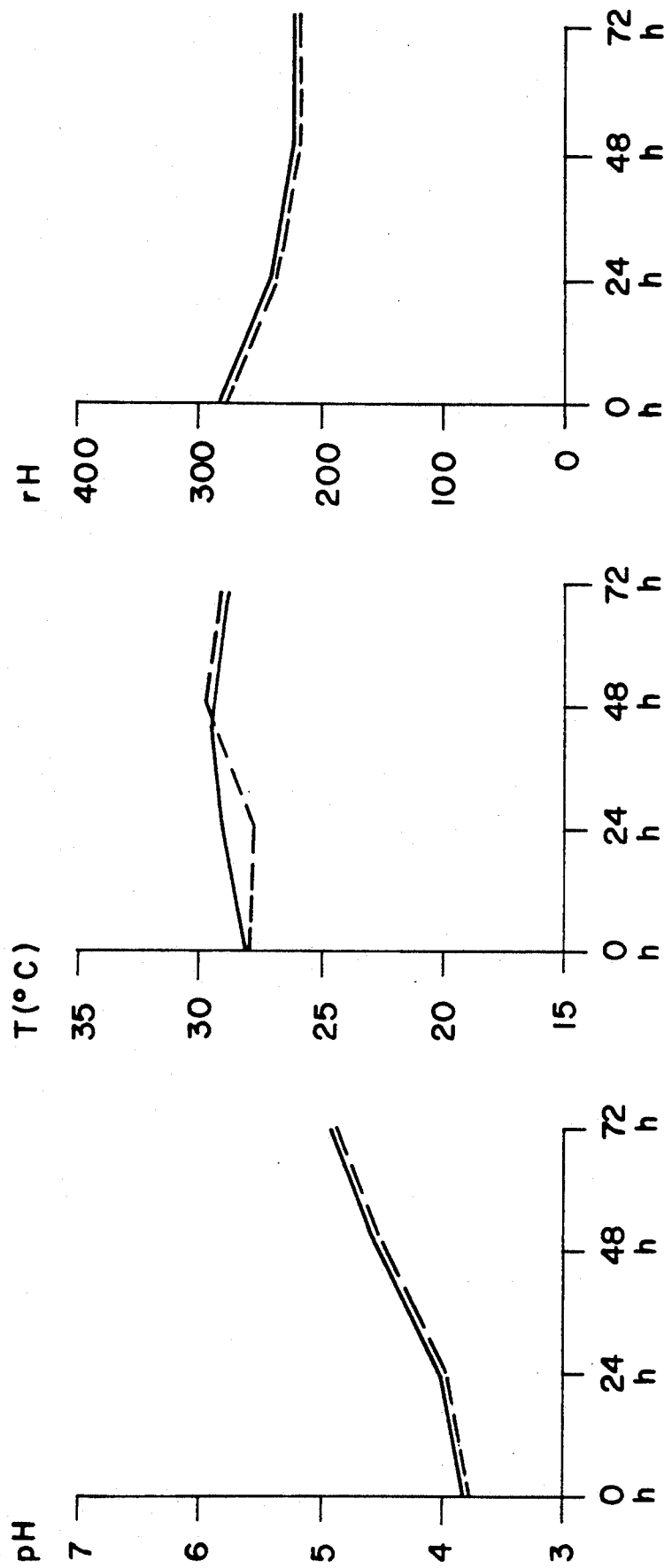
FIGS. 3A-3I, are graphs representing the various properties produced through the addition of *Pseudomonas putida* (B) to paper recycling water over 72 hours. (A) represents a parallel test over the same time period, under the same conditions, the only difference being that this sample was not inoculated with the *Pseudomonas putida* microorganism.
Figure 3F:
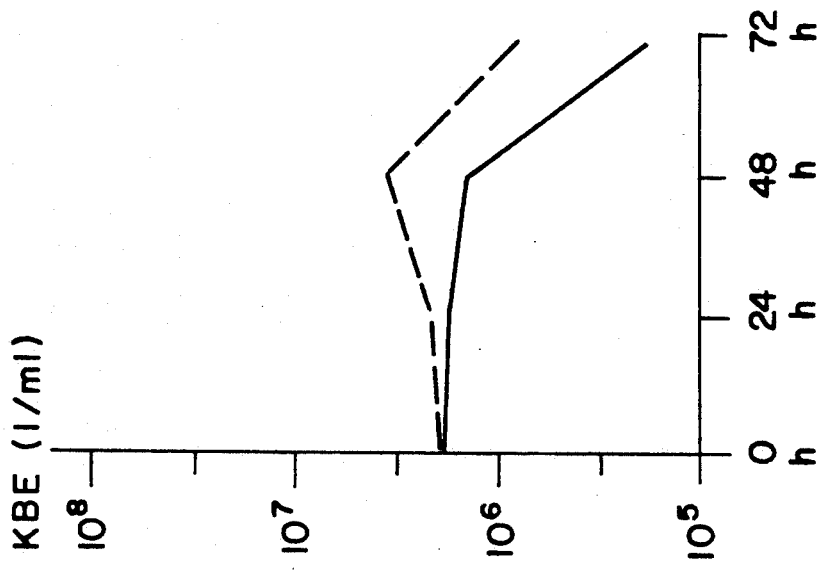
Figure 3E:
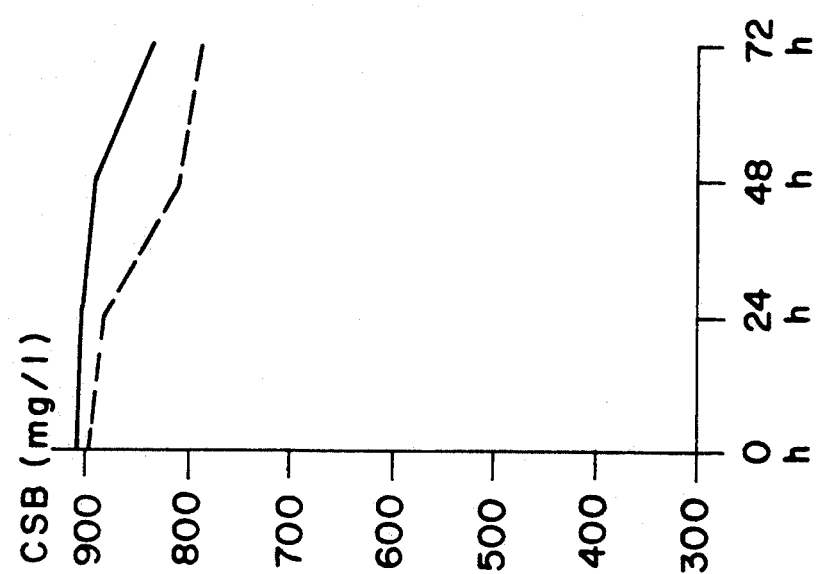
Figure 3D:
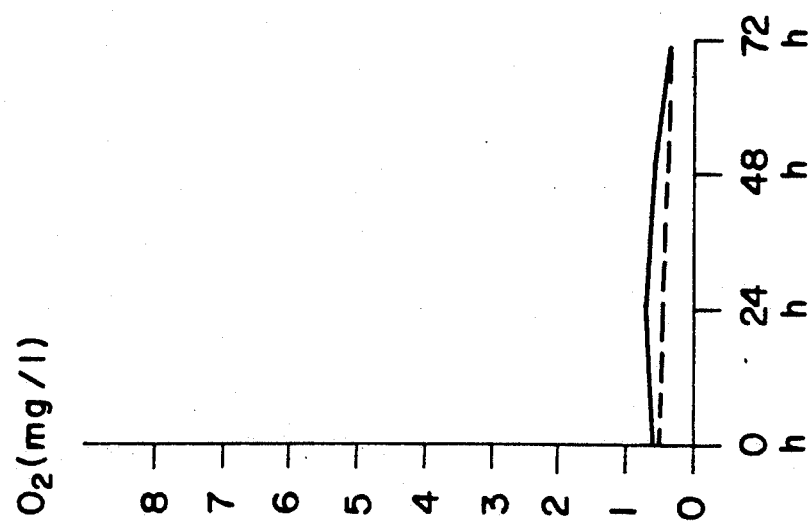
Figure 3I:
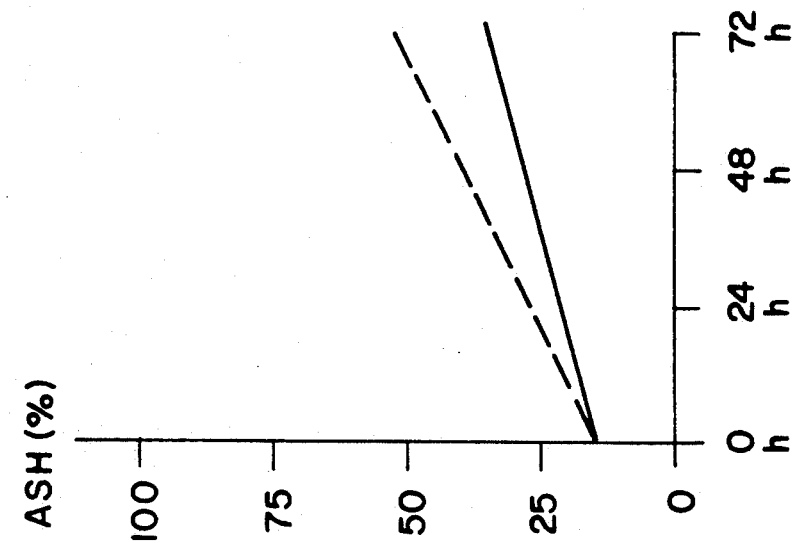
Figure 3H:
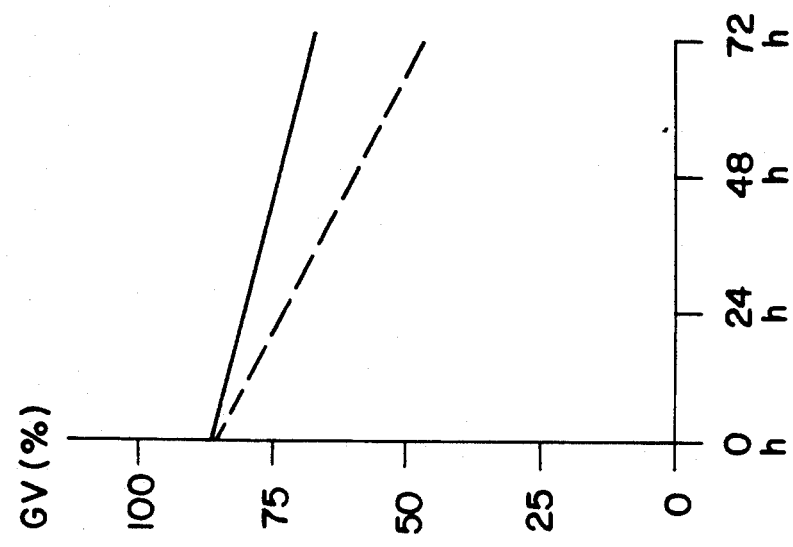
Figure 3G:
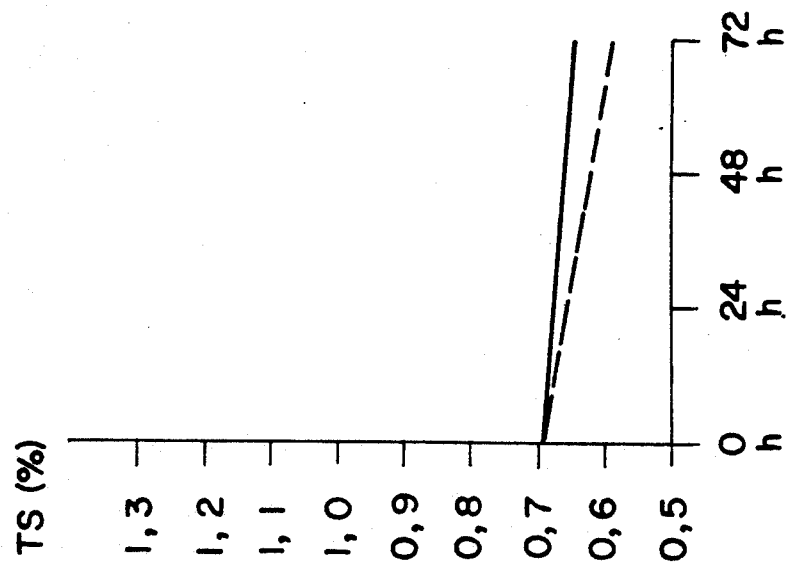
Figure 4F:
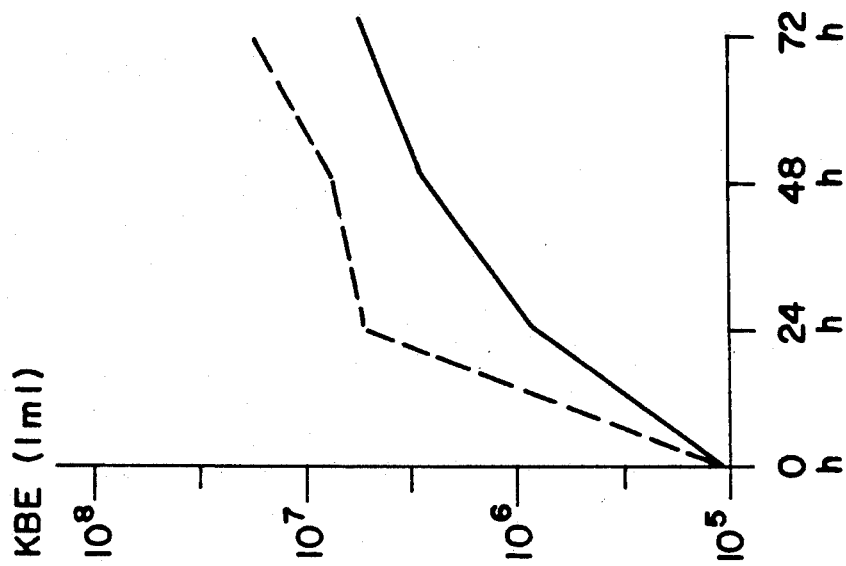
Figure 4E:
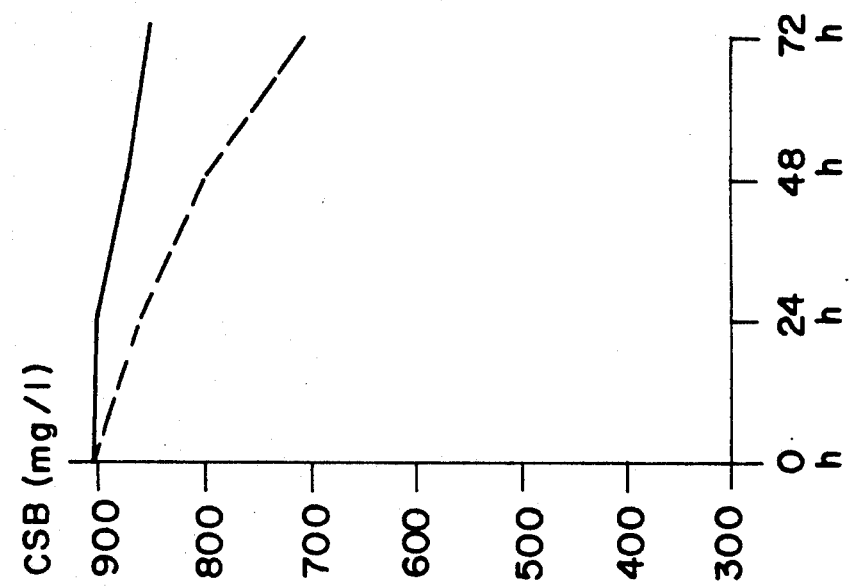
Figure 4D:
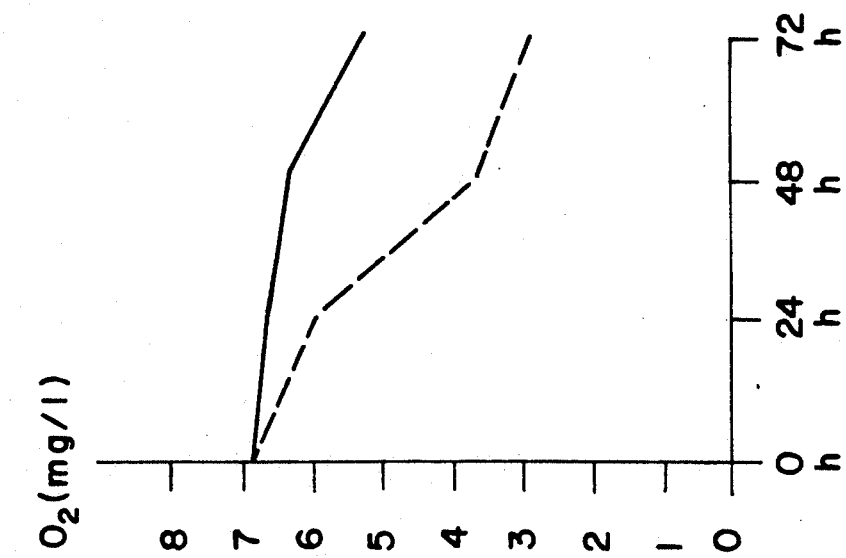
Figures 4G, 4H, 4I:
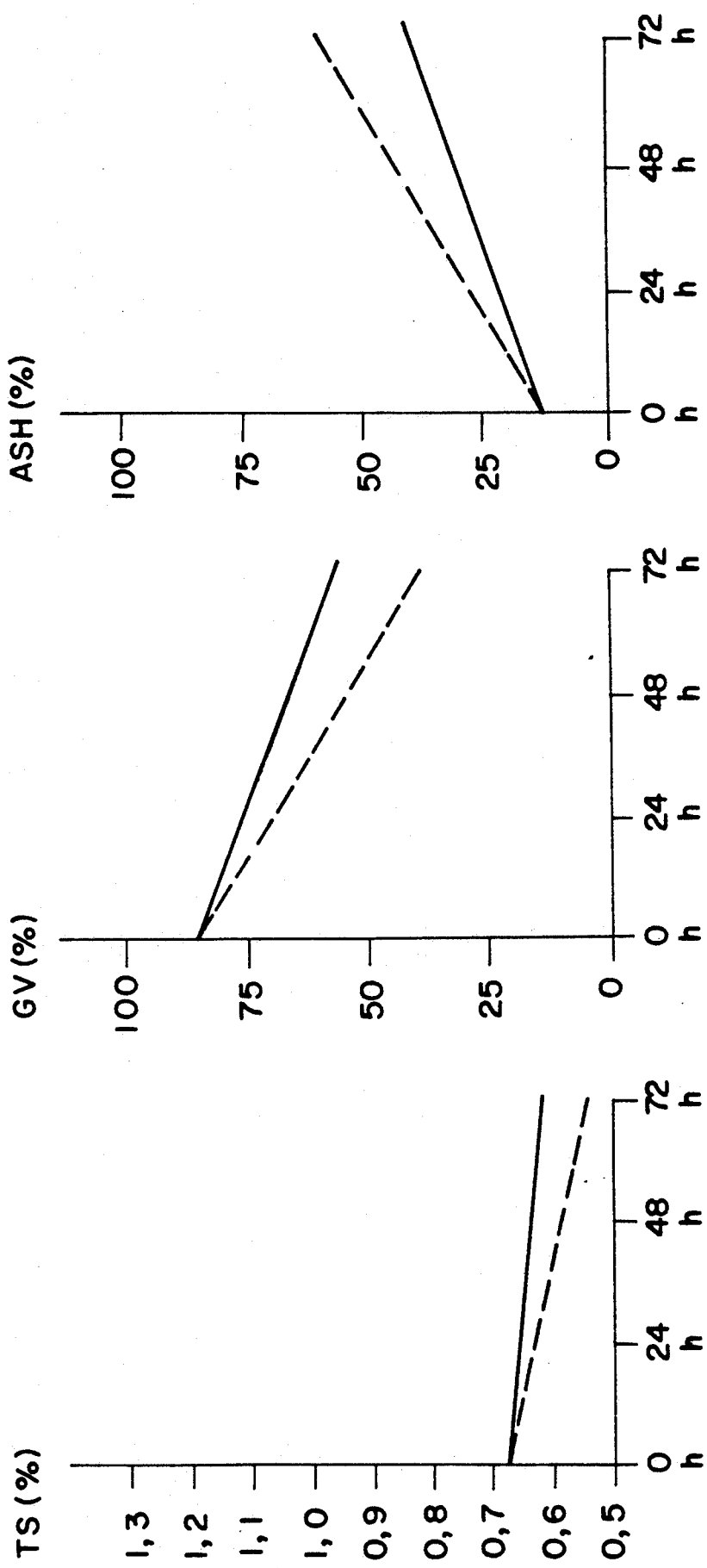

The present invention is directed to a method for circulates water, characterized in that non-sessile microorganisms are added in single form to the circulating water whereby the quantity of microorganisms added to the circulated water is 1 to $10^{10}$ microorganisms per kg of the total organic carbon (TOC) of the organic substances based on the quantity of organic substances in the circulation water. The invention is also based on a system for carrying out this method, as well as the various applications of this method for preventing the build-up of slime or film in a wide variety of industrial processes utilizing water circulation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The inventive method presents an environmentally safe way of treating the most diverse types of circulating water in such a manner that the build-up of slime and/or film is greatly reduced, thereby shortening the shut-down periods of the plant.

Microorganisms suitable for the inventive method have proved to be in particular bacteria, mainly bacteria of the following taxonomic groups: Aeromonas/Vibro; Acinetobacter; Alcaligenes; Enterobacter; Pseudomonas; Bacillus: Lactobacillus; Micrococcus; Staphylococcus; and, Streptococcus, in particular, *Aeromonas hydrophila; Acinetobacter calcoaceticus; Alcaligenes eutrophus; Escherichia coli; Nitrosomonas; Nitrobacter; Bacillus megaterium; Bacillus macerans: Bacillus polymyx; Bacillus subtilis; Bacillus stearothermophilus; Bacillus coagulans: Bacillus circulans; Bacillus cereus; Bacillus pasteurii:* Chromatium; *Pseudomonas arvilla; P. putida; P. stutzeri; P. fluorescens: P. denitrificans; P. aeruginosa;* Zoogloea; Zymomonas; Leuconostoc; *Proteus vulgaris: Sporosarcina ureae;* Rhodopseudomonas: Nocardia: Mycobacterium; Flavobacterium; Agrobacterium; Cytophaga; Sporocytophaga; Streptomyces; Micromonospora; Clostridium pectinovorum: *Clostridium felsineum;* Azotobacter; Streptococcus: Cellulomonas; Azomonas; Rhizobium; Thiobacillus; Thiothrix; Streptobacillus; Soaerothilus; *Enterobacter aerogenes;* Serratia; Propionibacterium; Micrococcus; Arthrobacter; Corynebacterium; Brevibacterium; Photobacterium; Xanthomonas; Chromobacterium; Vibrio; Acetobacter; and, Lactobacillus. Thus, in the following description of the invention, bacteria will be primarily referred to.

However, other microorganisms can also be used in the inventive method, such as fungi of the groups Myxomycetes, Phycomycetes, Ascomycetes, Basidiomycetes, and Deuteromycetes, in particular Acrasiales; *Asperigillus niger; Asperigillus oryzae; Asperigillus wentii: Candida lipolytica: Candida tropicalis;* Saccharomyces; Chaetomium: and Crvotococcus.

One can also use mixtures of bacteria or of fungi or mixtures of bacteria with fungi.

The bacteria used according to the invention are nonsessile bacteria, i.e. microorganisms or bacteria are selected which show no, or only little, tendency to settle on surfaces compared to the microorganisms or bacteria forming slime and film in the water circulation systems.

The tendency of the added microorganisms or bacteria to settle on surfaces can be further reduced according to the invention by adding tensides (i.e. surface-active substances) to the circulating water. A tenside which has been particular proved to be well-suited for use in the present invention is the a tenside called "Konsan", available from KW Kalos & Wiechmann GmbH, Hude.

According to the inventive method, the bacteria are added in a relatively large quantity. Furthermore, they are not used in lumps, flakes, or colonies but preferably as single or individual bacterium. Due to their large quantity and their single forms, the bacteria possess large a amount of total surface area, so that they exhibit strong absorption or intake of the nutrients existing in the circulation. This results in competition for the food present in the circulating water, which is essentially won by the added non-sessile bacteria due to their high food intake, and lost by the slime and film forming microorganisms.

In order to allow the bacteria to be added to the circulating water in an optimal single form, the invention preferably assumes dry bacteria or mixed cultures of dry bacteria which are stirred into a predetermined volume, whereby after an activation period of, for example, one to ten hours, the single activated bacteria can be added to the circulating water.

Mixed cultures of dry bacteria which have proven to be particularly well suited for the inventive method include those marketed under the name "DBC plus" by Enviroflow Flow Laboratories, Inc., A Flow General Company, McLean, Va. In this regard, "DBC Plus" product is generally utilized for the biodegradation of inorganic and organic garbage and/or waste. In the present invention, the product is utilized to suppress the build-up of slime and/or film due to the enhanced competition produced by the addition of these organisms for the food product in the circulatory water.

The "DBC plus" mixed cultures which are well suited for use in the present invention are selected in accordance with the nutrients present in the circulating water. A flora analysis of the new "DBC plus" types of dry bacteria mixtures indicate that the following main taxonomic groups are present: Aeromonas, Acinotobacter, Alcaligenes, Enterobacteria, Pseudomonas, and other gram-negative bacterias, Bacillus, Lactobacillus, Micrococcus, Staphylococcus, Streptococcus, and other gram-positive bacteria, and additional bacteria whose classification is questionable.

In this regard, it has been found that the "DBC plus type A2" mixed culture is particularly well suited for use with the circulating water of paper machines as well as for processes in petrochemistry where phenolic compounds may pass into the cooling water.

Further, it has been found that the "DBC plus type L" mixed culture is suitable for use with the cooling water circulation in refineries where hydrocarbons can break into the circulating water, as well as in the cooling circulation of oil mills, such as in the processing of vegetable oils. Furthermore, "DBC plus type L1" mixed culture may be used particularly in cooling circulations in the chemical industry, especially when ketones are expected to be in the cooling water.

The quantity of bacteria added to the circulating water based on the quantity of organic substances in the water is preferably 1 to $10^{10}$ bacteria (or microorganism) per kg of the total organic carbon (TOC) of the organic substances, in particular 10 to $10^9$ bacteria per kg of TOC and most preferably $10^2$ to $10^9$ bacteria per kg of TOC.

In dry bacteria, in particular "DBC plus" bacteria, this corresponds to about $10^{-6}$ to 50 g per kg of TOC, or $10^{-5}$ to 5 g per kg of TOC, or $10^{-4}$ to 0.5 g per kg of TOC.

Other additives are preferably also mixed into the circulating water along with the bacteria. As referred to above, tensides may be added for reducing the sessility of the bacteria and other microorganisms on the surfaces of the machine parts. It is also advantageous to promote the growth of the added bacteria by adding supplines (cf. Hans G. Schlegel, "Allgemeine Mikrobiologie" ("General Microbiology"), 6th ed., 1985, p. 174).

The addition of lignosulfonates, as described in German Patent No. 34 47 686, can also be advantageous to the present invention although the use of biocides is not recommended in the inventive method.

It is also advantageous in the inventive method to add enzymes which catalyze the breakdown of the organic substances contained in the circulating water. The enzymes used may, for example, be mylases, proteases, pectinases, cellulases, acylases, aldolases, alcanoxygenases, alkoholdehydrogenases, dehydrogenases, phosphatases, dehydrases, dehydratases, oxygenases, oxidases, permeases, kinases, carboxylases, lipases, phosphorylases, decarboxylases, reductases, oxidoreductases, and hemicellulases.

The type of enzyme used depends on the application in question. For example, cellulases and hemicellulases are preferably added to the white water of paper machines, while proteases are added to the cooling circulation in food processing, and lipases are added in particular to the cooling circulation in oil mills and other food processing plants.

The quantity of enzyme or enzymes added is preferably 10 IU (International Units) to 500,000 IU per kg of TOC. However, a quantity of maximally 10,000 or maximally 1000 IU per kg of TOC is generally sufficient.

Further, a high content of dissolved oxygen in the circulating water is advantageous in the inventive method. This accelerates the breakdown of the organic substances, thereby reducing the high load of these substances in the circulating water.

The oxygen can be supplied by aerating the circulating water with oxygen or air or by adding oxygen-releasing compounds, such as $H_2O_2$ or peroxides.

In the inventive method, the bacteria and further additives are preferably added continuously, which also includes the addition of smaller portions over time. This maintains the dominance of the added type of bacteria, thereby ensuring the process stability.

The bacteria and other additives may be added in time-proportional fashion, i.e a certain amount preferably added continuously for a certain time, e.g. one day. In addition, they may also be added continuously in proportion to quantity. That is, the TOC content is constantly analyzed, possibly automatically, and the amount of added bacteria and other additives regulated in accordance with the analyzed TOC content. In this regard, addition in proportion to quantity is preferable in particular for processes involving great fluctuations of the TOC content.

The invention is also based on a system for carrying out the inventive method, comprising a feed area in which the bacteria and/or other microorganisms, and possibly the other additives, are continuously added to the circulating water.

The feed area is preferably provided with a dosing means for automatically adding the microorganisms or bacteria, and optionally one or more other dosing means for automatically adding the other additives.

The individual components are added to the circulating water at places as separate as possible from the feed area. For example, if proteases are used as the enzymes, they are added at a place upstream of the place where the bacteria are added. This is because the proteases are intended to settle with their active centers on the organic substances in the circulation and catalyze their breakdown. If the active centers of the proteases came in direct contact with the added bacteria, they would accelerate the breakdown of the bacterioproteins and thus damage the added bacteria.

For this reason, $H_2O_2$, for example, is added at a place or at places located upstream of the place where the enzyme and the bacteria area added, since $H_2O_2$ in excessive concentration can damage the enzymes and the bacteria. As a result, $H_2O_2$ is therefore preferably added so that it is distributed over the entire system.

The inventive method is suited in particular for reducing the build-up of slime and/or film in plants which circulate the white water of paper machines, and in plants which circulate cooling water.

The present invention is more particularly described by the following non-limiting examples.

EXAMPLE 1

1. The setup for the Laboratory Tests

Two similar experimental plants as shown in FIG. 1 were set up for the laboratory tests. The plants were comprised of a supply vessel (1), a dosing pump (2), an air flow sensor (3), a frit (4), an aeration tank (5), a mammoth pump (6) and a settling tank (7).

Parallel operation of the two plants permitted comparative laboratory simulation for reducing the buildup of slime and/or film with and without the addition of the stated microorganisms. The plants corresponded in their structure to the activated-sludge plant shown in DIN 38 412 Part 24, page 5. However, the two plants were not operated as activated-sludge plants but as circulation plants.

2. Selection of the Test Material

In water cycles, in particular the increasingly used closed circulation of white water in paper machines and in cooling water cycles, there is often a build-up of slime and/or film on solid surfaces and in the liquid phase. In the increasingly used closed circulation of white water in paper machines, microorganisms are presented with very good growth conditions due to the high organic and inorganic nutrient supply in the white water and a favorable environment, such as an elevated temperature, a pH value near the neutral point and oxygen load. Since many of the microorganisms are not present in the circulation as free organisms but are attached to the fiber, and/or to the surfaces to the machine parts, such as pipes, vessels and pumps, the undesirable build-up of slime and film takes place. When the slime or film is detached from the surfaces this leads to the formation of knots and thus possibly holes in the paper web. This weakens the paper web, i.e. the web can break and thus cause machine down-time.

The following materials from paper machine cycles were used for carrying out the experiments:

1) Slime deposits
Paper factory Laakirchen
Paper machine no. 3
Recycling water

This material was used in laboratory test 1. The microorganism used for reducing the slime deposition was *Bacillus subtilis* DSM 402.

2) Film consisting of fiber, filler and accepts
Paper factory Laakirchen
Paper machine no. 3
Recycling water This material was used in laboratory tests 2 and 3. The microorganism used for reducing the film in test 2 was *Pseudomonas putida* DSM 437. The microorganism used in test 3 was *Lactobacillus brevis* DSM 1267.

3. Analytical Procedure for the Tests

The following analytical methods were used to document the course of the tests:

TOC (Total Carbon)

Since the amount of bacteria used depends on the TOC of the slime or film, the TOC of the two starting materials was first measured.

TS (Dry Matter)

The dry matter of the two starting materials was measured to detect the undissolved component. To document changes, the TS was also measured in the homogeneous sample in the further course of the experiments.

GV (Ignition Loss)

The ignition loss characterizes the organic component of the dry matter and thus shows the extent of a possible biological degradation. The value is calculated from the dry matter minus the ash content of the sample. It was measured in the homogeneous sample at the beginning and in the course of the experiments.

CSB (Chemical Oxygen Demand)

The CSB is a sum parameter mainly for the organic-chemical load of water. The decrease in CSB is a measure of biological degradation. The CSB was measured in the homogeneous sample at the beginning and in the course of the experiments.

KBEs (Nucleating Units)

The KBEs serve to detect the bacterial content. Rhw KBEs were determined on agar gel (48 hours) at various temperatures or alternatively by means of cardboard culture disks at 28° C. The KBEs were determined a) of the inoculum for calculating the amount added based on the TOC
b) of the recycling water throughout the test.

pH Value

The course of the pH value was measured in the recycling water throughout the test.

T (Temperature)

The temperature pattern was measured in the recycling water throughout the test.

rH value (Redox Potential)

The course of the rH value was measured in the recycling water throughout the test.

$O_2$ value (Oxygen Content)

The course of the $O_2$ value was measured in the recycling water throughout the test.

Microscopic Photographs

The microscopic photographs show optically the quantitative and qualitative changes in the slime and film during the course of the test.

Measurements of the TS, ash content, TOC were performed in the Chemical Laboratory Gustav H. Heger GesmbH, Mitterberghütten / Austria.

Measurements of the KBEs were performed by the Hydrologische Untersuchungsstelle Salzburg (state-authorized water analysis office).

The other measurements were performed on location at the experimental plants in the laboratory of PETRO-MONTAN Chemische Produkte für Umwelttechnik GesmbH & Co. KG, The results of analysis are stated in tabular form in the section "Test Results."

4. Chemicals + Biologics + Equipment

1) Microorganisms
*Bacillus subtilis* DSM 402
*Pseudomonas putida* DSM 437
*Lactobacillus brevis* DSM 1267

2) Nutrient media
Merck Art. No. 7882 for producing the inoculum
DEV agar gel (Merck 10685) for determining KBEs
Cardboard culture disks (Sartorius NKS Standard TTC)

3) Other chemicals
Lactophenol-blue for staining the microorganisms in the microscopic studies 4) Equipment
CSB determination: Merck Photometer SQ 118 Merck Spectroquant Cuvette Test 14541
pH, temperature, rodox determination: WTW Microprocessor pH-meter Electrodes: Pt - 4805 Sen Tix 96
Oxygen determination: SCHOTT $O_2$-meter CG 867
Microscope: LEITZ Laborlux K

5. Performance of the Laboratory Tests

Both experimental plants were filled with the starting materials from the paper recycling water. There were 3 liters of the starting material in the aeration device, 1 liter in the settling tank and 2 liters in the circulating vessel.

A diaphragm pump was used to pump the recycling water from the circulating vessel into the aeration system. From the aeration tank the medium was transferred to the settling tank and from there back into the circulating tank. The circulating pump delivered the medium at a through-put of 1 liter/h. Additionally the deposited material was circulated in a second "cycle" from the settling basin into the aeration tank at a through-put of 1 liter/h.

Air was supplied in the aeration tank in tests 1 and 2 by compressed air at a volume flow of 0.4 liter/min. In test 3 there was no aeration.

After the experimental plant was put into operation (air supply, mammoth pump, dosing pump), the inoculum was added to one of the two plants in the aeration tank. The time of addition marked the beginning of the test.

To produce the inoculum, the ampules with the particular microorganisms were opened according to instructions and inoculated into 50 ml of the nutrient medium. The batch was shaken and incubated for 48 h at 28° C. The KBEs were then measured.

The reference plant was not inoculated.

The duration of the test was 72 hours in each case. The measured values were measured in the aeration tank. The samples for the analytical procedure were likewise taken from the aeration tank.

6. Test Results

Test 1

Slime from the paper recycling water was mixed in plant B with the microorganism *Bacillus subtilis* DSM 402.

The TOC of the slime deposit from the homogeneous sample was 268 mg/l. The total volume of recycling water of the experimental plant was about 6 liters. The total TOC content of the plant was thus 1.608 mg/l.

The total number of nuclei (KBE) of the inoculum was $1.5 \times 10^6$ KBE/ml at the time of inoculation of the slime deposit with 3 ml.

According to claims of the patent application between 1 and $10^{10}$ microorganisms per kg TOC were added to the recycling water. For test 1, $2.8 \times 10^8$ KBE/kg TOC were calculated from the stated figures.

The duration of the test after inoculation was 3 days. The test measurements and observations were listed in Table 1 and set forth in FIGS. 2A-2F.

Experimental plant A runs parallel under the same conditions for the same time, the only difference being that this plant was not inoculated.

Test 2

Film from the paper recycling water was mixed in plant B with the microorganism *Pseudomonas putida* DSM 437.

The TOC of the film from the homogeneous sample was 2.108 mg/l. The total volume of recycling water of the experimental plant was about 6 liters. The total TOC content of the plant was thus 2.214 g/6 l.

The total number of nuclei (KBE) of the inoculum was $5.0 \times 10^6$ KBE/ml at the time of inoculation of the film with 3 ml.

For test 2, $6.8 \times 10^9$ KBE/kg TOC were calculated from the stated figures.

The duration of the test after inoculation was 3 days. The test measurements and observations were listed in Table 2 and FIGS. 3A-3I.

Experimental plant A runs parallel under the same conditions for the same time, the only difference being that this plant was not inoculated.

Test 3

Film from the paper recycling water was mixed in plant B with the microorganism *Lactobacillus brevis* DSM 1267.

As in test 2 the total TOC content of the plant was 2.214 mg/l.

The total number of nuclei (KBE) of the inoculum was $1.4 \times 10^6$ KBE/ml at the time of inoculation of the film with 3 ml.

For test 3, $1.9 \times 10^9$ microorganisms were calculated from the stated figures.

The duration of the test after inoculation was 3 days. The test measurements and observations were listed in Table 3 and FIGS. 4A-4I.

Experimental plant A runs parallel under the same conditions for the same time, the only difference being that this plant was not inoculated.

TABLE 1

MEASURED VALUES FOR *BACILLUS SUBTILIS*

| Duration of test | 0 h | | 24 h | | 48 h | | 72 h | |
|---|---|---|---|---|---|---|---|---|
| Measured values | A | B | A | B | A | B | A | B |
| pH | 7,9 | 7,9 | 7,6 | 7,3 | 7,7 | 7,4 | 7,6 | 7,3 |
| T (°C.) | 19 | 19 | 18 | 18 | 17,3 | 17,3 | 19 | 19 |
| rH | 90 | 90 | 150 | 150 | 170 | 170 | 180 | 180 |
| PO$_2$ (ppm) | 6,8 | 6,8 | 5,5 | 2,7 | 4,0 | 2,2 | 3,4 | 1 |
| CSB (mg/l) | 595 | 595 | 570 | 527 | 530 | 475 | 507 | 398 |
| KBE/ml | $8 \times 10^7$ | $8 \times 10^7$ | $1,9 \times 10^7$ | $2,1 \times 10^8$ | $1,5 \times 10^6$ | $7,5 \times 10^7$ | $1 \times 10^5$ | $6 \times 10^6$ |

TABLE 2

Measured values for *Pseudomonas putida*

| Duration of test | 0 h | | 24 h | | 48 h | | 72 h | |
|---|---|---|---|---|---|---|---|---|
| Measured values | A | B | A | B | A | B | A | B |
| pH | 3,8 | 3,8 | 3,9 | 4,0 | 4,5 | 4,5 | 4,9 | 4,8 |
| T (°C.) | 28 | 28 | 28,8 | 28 | 29,5 | 30 | 28,6 | 29,3 |
| rH | 280 | 280 | 240 | 240 | 220 | 220 | 220 | 220 |
| *PO$_2$ (ppm) | 0,5 | 0,5 | 0,6 | 0,5 | 0,5 | 0,5 | 0,3 | 0,4 |
| CSB (mg/l) | 905 | 905 | 900 | 881 | 884 | 817 | 826 | 793 |
| KBE/ml | $2,6 \times 10^6$ | $2,6 \times 10^6$ | $2,3 \times 10^6$ ↓ | $2,7 \times 10^6$ ↑ | $1,2 \times 10^6$ ↓ | $5,4 \times 10^6$ ↑ | $1,7 \times 10^5$ | $7,8 \times 10^5$ ↓ |
| TS (%) | 0,68 | 0,68 | — | — | — | — | 0,66 | 0,59 |

TABLE 2-continued

| Duration of test | Measured values for *Pseudomonas putida* | | | | | | | |
|---|---|---|---|---|---|---|---|---|
| | 0 h | | 24 h | | 48 h | | 72 h | |
| Measured values | A | B | A | B | A | B | A | B |
| GV % TS | 86,1 | 86,1 | — | — | — | — | 67 | 48 |
| Ash % TS | 13,9 | 13,9 | — | — | — | — | 33 | 52 |

TABLE 3

| Duration of test | Measured values for *Lactobacillus brevis* | | | | | | | |
|---|---|---|---|---|---|---|---|---|
| | 0 h | | 24 h | | 48 h | | 72 h | |
| Measured values | A | B | A | B | A | B | A | B |
| pH | 3,8 | 3,8 | 3,9 | 4,3 | 4,2 | 5,1 | 4,6 | 5,5 |
| T (°C.) | 35 | 35 | 28,5 | 28,2 | 28,8 | 28,8 | 28 | 27 |
| rH | 280 | 280 | 280 | 280 | 280 | 280 | 310 | 318 |
| PO$_2$ (ppm) | 6,9 | 6,9 | 6,7 | 6,0 | 6,4 | 3,8 | 5,4 | 2,9 |
| CSB (mg/l) | 905 | 905 | 898 | 859 | 871 | 793 | 855 | 701 |
| KBE/ml) | $1,2 \times 10^5$ | $1,2 \times 10^5$ | $9,6 \times 10^5$ | $7,4 \times 10^6$ | $4,8 \times 10^6$ | $9,0 \times 10^6$ | $7,2 \times 10^6$ | $2,8 \times 10^7$ |
| TS (%) | 0,68 | 0,68 | — | — | — | — | 0,63 | 0,55 |
| GV % TS | 86,1 | 86,1 | — | — | — | — | 58 | 39 |
| Ash % TS | 13,9 | 13,9 | — | — | — | — | 42 | 61 |

7. Discussion of the Results

Since the test materials "slime" and "film" were taken directly from the critical areas of the recycling water of a paper machine, the laboratory tests were highly representative as if the experimental plants were completely filled with this material at the beginning of the test.

A biological system often reacts differently when it is operated in differently designed plants. To rule out such an effect, a parallel experiment was conducted without the microorganisms in a plant of identical construction alongside the actual experiment with the required microorganisms.

Direct comparison of the parallel experiments clearly indicates that the reduction of the build-up of slime and film in the recycling water was caused by the addition of single microorganisms.

Test 1

At the end of the test the material that was inoculated was more pumpable. The microscopic picture (not shown) of a sample from the inoculated plant B indicated that the sample had a looser structure with more bacterial mass than A.

The pH value and redox potential were not significantly different in the two plants, but sometimes even identical. For test 1, the plants could not be heated so that they both leveled out at room temperature.

The decrease in the oxygen content in plant B correlated very well with the greater increase in KBEs. The biological activity in this plant was improved over the reference plant.

This is also shown by the decrease in CSB that was due to biological degradation.

Test 2

At the end of the test the plant B material from test 2 has clearly become more voluminous macroscopically due to the inoculation when compared to plant A. The structure was also losser in B than in A microscopically.

In this test the redox values were largely synchronous. The pH value differed by about 1 unit at the end of the test and was still in the suboptimal range even in the inoculated plant, although it was clearly shifted toward the neutral value.

The acidic pH value also explained why the increase in KBE or reduction in CSB does not take place faster despite the elevated temperature. In experimental plant B with inoculation, the better values were definitely achieved. This was shown very clearly in the total decrease of dry matter in the sample, and to an even greater extent in the drop in ignition loss from 86 to 39% of the TS.

Even if an error of 25% is possible in TS and ash measurements, the tendency was clear.

Test 3

As in test 2, a more voluminous sludge was shown in plant B at the end of test 3.

This test was performed in a low-oxygen range since *Lactobacillus brevis* is a fermenting microorganism, albeit oxygen-tolerant.

The pH value remained clearly in the acidic range throughout the test. The redox potential dropped. The temperature was regulated in this test for the first time. The number of nuclei was one to two powers of ten below that in aerobic tests 1 and 2. CSB, TS, GV values decreased less than in tests 1 and 2.

However, there was a clear difference between the results of plants A and B in this test as well.

A direct comparison between the results from two experimental plants supported the claims of the present application, according to which the addition of microorganisms contributes to reducing the build-up of slime and/or film in recycling water.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the preferred embodiments, the invention is now claimed to be:

1. A method for reducing the build-up of slime and film in a plant which circulates water, comprising the steps of adding non-sessile microorganisms in single form to the circulating water, whereby the quantity of microorganisms added to the circulating water is 1 to $10^{10}$ microorganisms per kg of the total organic carbon (TOC) of the organic substances present in the circulating water.

2. The method of claim 1, wherein the microorganisms added are bacteria.

3. The method of claim 2, wherein the bacteria is selected from the taxonomic groups consisting of:
Aeromonas/Vibrio,
Acinetobacter,
Alcaligenes,
Enterobacteria,
Pseudomonas,
Bacillus,
Lactobacillus,
Micrococcus,
Staphylococcus, and
Streptococcus,
or mixtures thereof.

4. The method of claim 2, wherein the bacteria used is dry bacteria or mixed cultures of dry bacteria.

5. The method of claim 4, wherein the mixed cultures of dry bacteria used are mixed cultures available under the name "DBC plus" from Enviroflow Flow Laboratories, Inc., USA.

6. The method of claim 1, wherein the quantity of microorganisms added is 10 to $10^9$ microorganisms per kg of TOC.

7. The method of claim 6, wherein the quantity of microorganisms added is $10^2$ to $10^8$ microorganisms per kg of TOC.

8. The method of claim 1, further comprising the step of adding additives selected from the group consisting of enzymes, supplines, tensides, and lignosulfonates to the circulating water.

9. The method of claim 8, wherein the quantity of the enzyme added is 10 IU (International Units) to 500,000 IU per kg of TOC.

10. The method of claim 9, wherein the quantity of the enzyme added is 10 to 10,000 IU per kg of TOC.

11. The method of claim 9, wherein the quantity of the enzyme added is 10 to 1000 IU per kg of TOC.

12. The method of claim 8, wherein the addition of the additives takes place continuously.

13. The method of claim 12, wherein the addition of the additives takes place in proportion to time or to quantity.

14. The method of claim 1, further comprising the step of adding oxygen to the circulating water.

15. The method of claim 14, wherein the oxygen is added by aerating the circulating water with air or oxygen or in the form of oxygen-releasing compounds.

16. The method of claim 14, wherein the addition of the oxygen takes place continuously.

17. The method of claim 16, wherein the addition of the oxygen takes place in the proportion to time or to quantity.

18. The method of claim 1, wherein the addition of the microorganisms takes place continuously.

19. The method of claim 18, wherein the addition of the microorganisms takes place in proportion to time or to quantity.

* * * * *